(12) United States Patent
Gong et al.

(10) Patent No.: US 11,497,218 B2
(45) Date of Patent: Nov. 15, 2022

(54) DUMPLING AUTOMATION MACHINE

(71) Applicant: General Mills, Inc., Minneapolis, MN (US)

(72) Inventors: Hao Gong, Changning Distric Shanghai (CN); Xiaogang Xiong, Changning Distric Shanghai (CN); Yihui Li, Changning Distric Shanghai (CN); Gang Wang, Changning Distric Shanghai (CN); Derong Wang, Changning Distric Shanghai (CN); Ying Ren, Changning Distric Shanghai (CN)

(73) Assignee: General Mills, Inc., Minneapolis, MN (US)

( * ) Notice: Subject to any disclaimer, the term of this patent is extended or adjusted under 35 U.S.C. 154(b) by 362 days.

(21) Appl. No.: 16/676,768

(22) Filed: Nov. 7, 2019

(65) Prior Publication Data

US 2020/0068905 A1 Mar. 5, 2020

Related U.S. Application Data

(63) Continuation of application No. 15/739,313, filed as application No. PCT/US2016/041629 on Jul. 8, 2016, now Pat. No. 10,506,814.

(30) Foreign Application Priority Data

Jul. 8, 2015 (CN) .......................... 201510399005.0
Jul. 8, 2015 (CN) .......................... 201520490635.4

(51) Int. Cl.
*A21C 9/06* (2006.01)
*A21C 9/08* (2006.01)
(Continued)

(52) U.S. Cl.
CPC .............. *A21C 9/063* (2013.01); *A21C 9/065* (2013.01); *A21C 9/08* (2013.01); *A21C 11/02* (2013.01); *A21C 11/16* (2013.01)

(58) Field of Classification Search
CPC ........... A21C 9/06; A21C 9/063; A21C 9/065; A21C 9/08; A21C 9/088; A21C 11/02; A21C 11/16
See application file for complete search history.

(56) References Cited

U.S. PATENT DOCUMENTS 4,160,634 A    7/1979  Huang
4,388,059 A *  6/1983  Ma ........................ A21C 9/063
                                                              425/112

(Continued)

FOREIGN PATENT DOCUMENTS

CN          201846720          6/2011
CN          202232844          5/2012
(Continued)

OTHER PUBLICATIONS

Huang, et al., CN103229792 Machine Translation performed on Oct. 28, 2021 (Year: 2015).*

(Continued)

*Primary Examiner* — Brian W Jennison
(74) *Attorney, Agent, or Firm* — Diedereiks & Whitelaw, PLC; John L. Crimmins, Esq.

(57) ABSTRACT

The present invention provides a dumpling automation machine for preparing dumpling-like food product, comprising a pressing and cutting device for dough pad, a filling injection device and a forming assembly, wherein the forming assembly comprises: a mold assembly for supporting a dough pad injected with a filling and maintaining the dough pad in an upright position; a pre-forming assembly for pre-pressing the upright dough pad to form a pre-pressed crest; and a forming assembly for pressing the pre-pressed (Continued)

crest to from a crest; wherein the mold assembly is configured to successively support the dough pad in different positions along a conveyor, and wherein in a pre-forming position, pre-bending portions on the two ends of the crest are formed by the pre-forming assembly, and in a forming position, the pre-bending portions are bent to form bending portion by a bending assembly.

15 Claims, 8 Drawing Sheets

(51) Int. Cl.
A21C 11/02 (2006.01)
A21C 11/16 (2006.01)

(56) References Cited

U.S. PATENT DOCUMENTS

| | | | |
|---|---|---|---|
| 4,448,576 A | 5/1984 | Liu | |
| 5,699,655 A * | 12/1997 | Kuboyama | B65B 25/001 53/116 |
| 9,028,240 B2 * | 5/2015 | Vargas | A21C 9/088 425/324.1 |
| 9,980,493 B2 * | 5/2018 | Lee | A21C 9/063 |
| 2012/0219674 A1 | 8/2012 | Lee et al. | |
| 2015/0125564 A1 * | 5/2015 | Chen | A21C 9/065 425/297 |
| 2016/0125564 A1 | 5/2016 | Bayne | |

FOREIGN PATENT DOCUMENTS

| | | |
|---|---|---|
| CN | 102726671 | 10/2012 |
| CN | 203058256 | 7/2013 |
| CN | 103229792 | 8/2013 |
| CN | 203219914 | 10/2013 |
| CN | 203801587 | 9/2014 |
| CN | 204949293 | 1/2016 |
| DE | 19831253 | 1/2000 |
| JP | 2007049937 | 3/2007 |
| JP | 2015015944 | 1/2015 |

OTHER PUBLICATIONS

Machine Translation—WA, et al. CN 201 846 720 performed on Jun. 9, 2022 (Year: 2011).*

* cited by examiner

DUMPLING AUTOMATION MACHINE

CROSS-REFERENCE TO RELATED APPLICATIONS

The present application represents a continuation application of application Ser. No. 15/739,313, filed Dec. 22, 2017, pending, which represents a National Stage application of PCT/US2016/041629 entitled "Dumpling Automation Machine", filed Jul. 8, 2016. The entire content of these applications is incorporated herein by reference.

FIELD OF THE DISCLOSURE

The present invention generally relates to the food processing filed, and more particularly to a dumpling automation machine.

BACKGROUND OF THE DISCLOSURE

Currently, the fast rice and flour food manufacturer typically utilizes some automation devices to improve the yield in the producing process. Taken the dumpling as an example, dough mixing, dough pad cutting, filling injecting and dumpling forming are mostly accomplished by the automation devices, and thus the production efficiency is significantly increased as compared to the manual production.

However, due to particularity of the process of flour food with filling, there is no a series of complete technologies to accomplish the automatic forming of the flour food in the current fast rice and flour food manufacturing field. For the dumpling, the current process can accomplish the automatic pressing of the dough pad, the automatic injecting of the filling and the pre-forming of the dumpling with a half-moon-like shape, but still needs people to pinch the dumpling and put it into the box for packaging. On one hand, the cost of labor restricts the economic benefit of the manufacturer, and on the other hand, due to the variety of the people, the shapes of the final dumplings are very different, thereby affecting the aesthetic effect. Additionally, also due to the manual process, the pinching force is difficult to control, thus the filling may overflow, and there are uncertain factors in the operation of packaging the dumpling into the box.

SUMMARY

In order to overcome the defects in the prior art, the present invention provides an automatic process device for forming dumpling-like food product, which can accomplish the complete automatic process of the dumpling-like food product without manual operation of people.

It should be noted that, terms like "dumpling-like food product" as used herein not only indicate the traditional food product of Chinese dumplings but also include other dumpling-like food products such as Japanese dumplings, pierogi, ravioli, etc. For a purpose of easy description, opposite margins of a dough pad that are pinched together and thereby stick to each other so as to form an arcuate ridge will be called herein as a "crest". And, the bulging part that holds a filling therein will be called as a "pocket" or "filling pocket" in the description herein. The dumpling-like food product in this invention all comprises a filling pocket, and form a half-moon-like shape by the pressing operation via people or machines, and has a central bulging filling pocket and a peripheral arcuate crest bordering the pocket.

In order to achieve the objective of complete automation process, the present invention provides a dumpling automation machine comprising a forming assembly for preparing dumpling-like food product, the forming assembly comprising a pair of reciprocating forming plates arranged opposite to each other, a crab-claw structure being provided on at least one of the forming plates and comprising a plurality of crab-claw fingers articulated together, after the pair of forming plates being reciprocated toward each other and pressed, the plurality of crab-claw fingers pivoting to press and form one or more convex ribs on a filled pocket of the dumpling.

The present invention can integrate the pressing and cutting of the dough pad, the injecting of the filling, and the pre-forming and forming of the dough pad without the participation of people in the forming of the dumpling-like food product, thus the present invention can replace the traditional manufacturing mode of manual dumpling process and thus the productivity effect can be significantly increased. Moreover, the forming of the dumpling-like food products completely depend on the forming mold of the machine, thus the products have uniform shape and reliable quality. Additionally, the present invention creatively forms bending portions on the two ends of the crest of the dumpling-like food product, and this unique shape has an attractive appearance which helps to put the dumpling-like food product into a box and facilitates the packaging.

Based on the above concept, the present invention may be taken in any one or more embodiments as follows.

According to a preferable embodiment, the mold assembly comprises a cover plate and a bottom plate spaced from each other in a vertical direction, and one or more cup stands are arranged between the cover plate and the bottom plate and installed on the bottom plate, and wherein each cup stand has an opening communicated with an opened groove in the cover plate so that the dough pad cut down is directed to pass through the opened groove and supported in the cup stand in the upright position after being injected with the filling.

According to a preferable embodiment, the pre-forming assembly comprises a first pressing plate and a second pressing plate arranged opposite to each other, and when the mold assembly is in the pre-forming position, the first pressing plate and the second pressing plate are reciprocatingly moved along a top of the cover plate relative to each other so as to pre-press the dough pad to form the pre-pressed crest.

According to a preferable embodiment, one of the first pressing plate and the second pressing plate is provided with an inclined shearing surface, and the other one is provided with a corresponding inclined shearing projection so that when the first pressing plate and the second pressing plate press relatively, the dough pad is fitted between the inclined shearing surface and the inclined shearing projection to form the pre-bending portions on the two ends of the crest.

According to a preferable embodiment, the forming assembly comprises a first forming plate and a second forming plate arranged opposite to each other, and when the mold assembly is in the forming position, the first forming plate and the second forming plate are reciprocatingly moved along a top of the cover plate relative to each other so as to press and form the crest.

According to a preferable embodiment, the first forming plate is provided with a crab claw structure having a plurality of crab claw sheets articulated together, and after the first forming plate and the second forming plate are pressed, the plurality of crab claw sheets pivot relatively to press and form one or more convex ribs on a filling pocket of the dumpling.

According to a preferable embodiment, the bending assembly is arranged on the mold assembly, and comprises a sliding rod arranged in the cup stand, a sliding block capable of moving along the sliding rod and a pair of bending rods arranged on the two sides of the sliding block and swinging from the horizontal direction to the perpendicular direction, and when the mold assembly is in the forming position, the sliding block and the bending rods slide out of the cup stand and the bending rods swing upwards to bend the pre-bending portions on the two ends of the crest to from the bending portions.

According to the present invention, the dumpling automation system further comprises a clamping device for clamping and putting the dumpling-like food product formed by pressing into a box.

According to a preferable embodiment, the clamping device comprises a first clamp and a second clamp capable of abutting against each other, and the first clamp and the second clamp are respectively provided with a bending area for bending the bending portions so as to help to put them into the box when the first clamp and the second clamp abut and press the dumpling-like food product formed by pressing.

According to a preferable embodiment, the first clamp and the second clamp are respectively provided with structural portions corresponding to surficial features of the dumpling-like food product formed by pressing, thereby enhancing the forming during the clamping.

According to a preferable embodiment, the conveyor comprises a circular rotary guide rail. With this arrangement, the mold assembly and the dough pad can be repeatedly conveyed in different positions in a rotatory form, and the pre-forming assembly, the forming assembly and the clamping device only need to be arranged in a single position. As compared with the prior process line, the whole dumpling automation machine occupies a relatively small space and therefore can be utilized in most applications.

The mold assembly and the pre-forming assembly are provided to help to form the pinch lines along with the crab claw structure and form the bending portions at two ends of the crest. The mold assembly, the pre-forming assembly and the forming assembly having crab claw structure are complementary to each other. The mold assembly ensures the formation of the crest. Also, the mold assembly is provided with the bending assembly for bending two ends of the crest. Moreover, the pre-forming assembly is also provided with pre-bending features for pre-bending the ends of the crest during the pre-pressing operation. With such design, the bending portions can be easily formed when the dumpling is formed by the crab claw structure and the bending assembly at the forming position. It is easy to clamp and put the dumpling having the bending portions at two ends thereof into the box. Such design makes the dumplings have an excellent appearance and convenience of stacking each other.

BRIEF DESCRIPTION OF THE DRAWINGS

Other features, objects and advantages will become apparent by reference to the following description of the illustrative embodiments taken in conjunction with the accompanying drawings.

DETAILED DESCRIPTION

Figure 1:
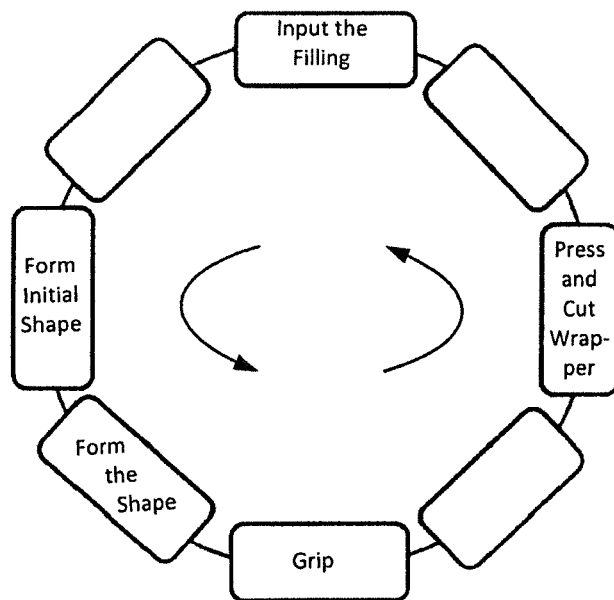
FIG. 1 schematically illustrates the position arrangement of a dumpling automation machine according to the present invention.

In the following description, the attached drawings are referred to. The drawings constitute a part of the present invention, and some specific embodiments for implementing the present invention are shown by way of example in the drawings. In this regard, some orientation terms, such as "left", "right", "top", "bottom", "front", "back", "guide", "forwards", and "backwards", are used with reference to the directions shown in the drawings. Thus, the members of the embodiments of the present invention may be arranged in different directions, and the orientation terms are used as example rather than limitation. It may be appreciated that without departing from the scope of the present invention, other embodiments may be used, or some structural or logical changes may be possible. Therefore, the following specific description is not meant as a limitation of the present invention, and the scope of the present invention is defined by the attached claims.

Firstly, referring to FIG. 1, a dumpling automation machine of the present invention can integrate a pressing and cutting device for dough pad, a filling injecting device and a forming assembly in position arrangements distributed circularly, wherein the forming assembly comprises a mold assembly, a pre-forming assembly and a forming assembly. As the mold assembly can move along the circular rotatory guide rail, the dough pad cut by cutters is received in the dough pad cutting position, the filling is injected in the filling injecting position, and the pre-pressed crest and the pre-bending portions on the two ends thereof are formed by pre-pressing the dough pad via the pre-forming assembly in the pre-forming position, and the crest are formed by the forming assembly and the pre-bending portions are bent to form bending portions via the bending assembly in the forming position. Finally, the formed dumpling-like food products are clamped by the clamping device and put into a box for packaging in the clamping position. After the whole forming process, the mold assembly moves to the dough pad cutting position in another circulation along the circular rotatory guide rail. It should be noted that the embodiment shown in the drawings is exemplary, and considering the moving space of each structure, eight positions are shown and void positions are left for buffering. However, according to the actual arrangement requirements, less or more positions are also possible.

For the purpose of simplicity, the conveyor and the driving mechanism are not shown in the specific structures shown in the following drawings. The drawings schematically illustrate the main members of the forming assembly and the clamping device of the dumpling automation machine. It may be appreciated that the person skilled in the art can utilize the members shown in the drawings and the connecting mechanism or the driving mechanism in any appropriate forms based on the concept of the present invention.

Figure 2:
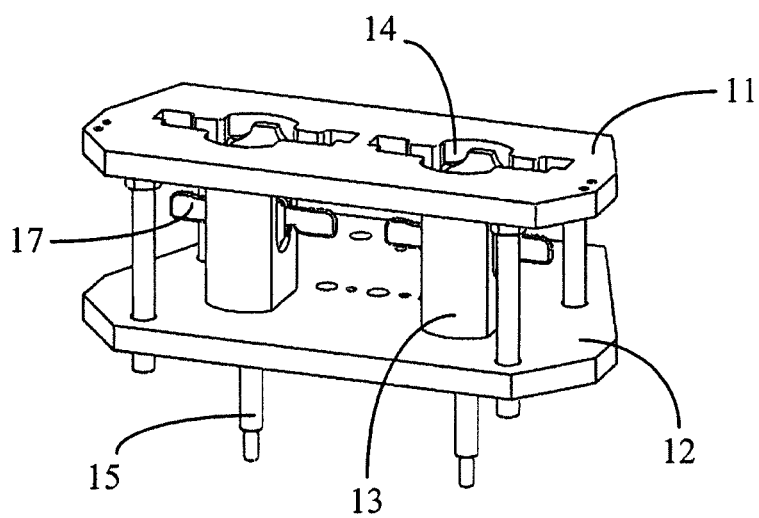
FIG. 2 is a schematic view illustrating a mold assembly of the dumpling automation machine according to a preferable embodiment of the present invention.
Figure 3:
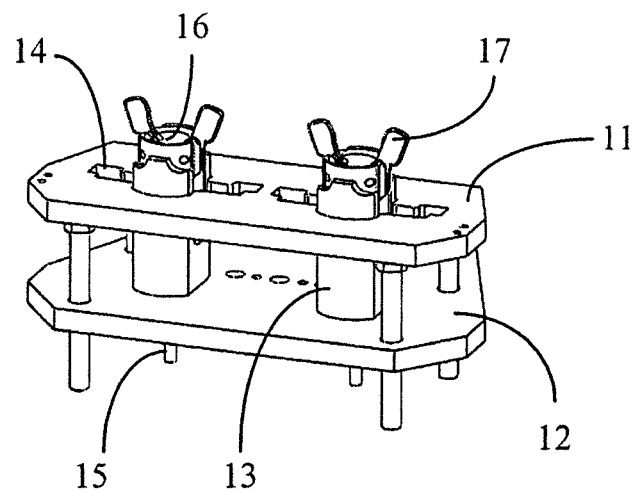
FIG. 3 is a schematic view illustrating the mold assembly of FIG. 2 in the forming position.
Figure 4:
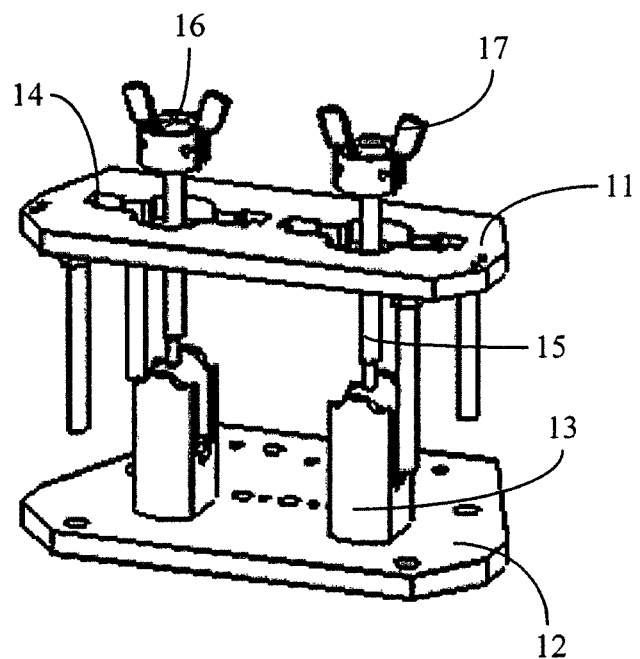
FIG. 4 is an exploded view of the mold assembly of FIG. 3.
Figure 5:
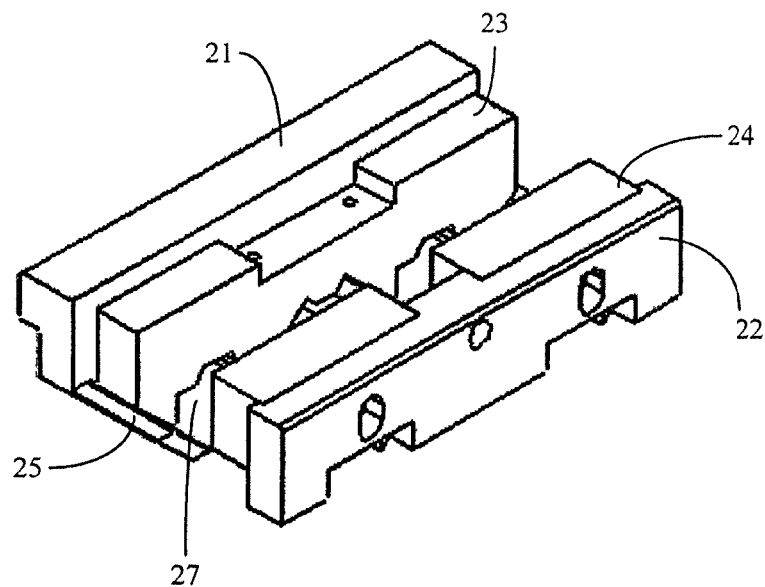
FIG. 5 is a schematic view illustrating a pre-forming assembly of the dumpling automation machine according to a preferable embodiment of the present invention, wherein the forming assembly is in the non-pressed state.
Figure 6:
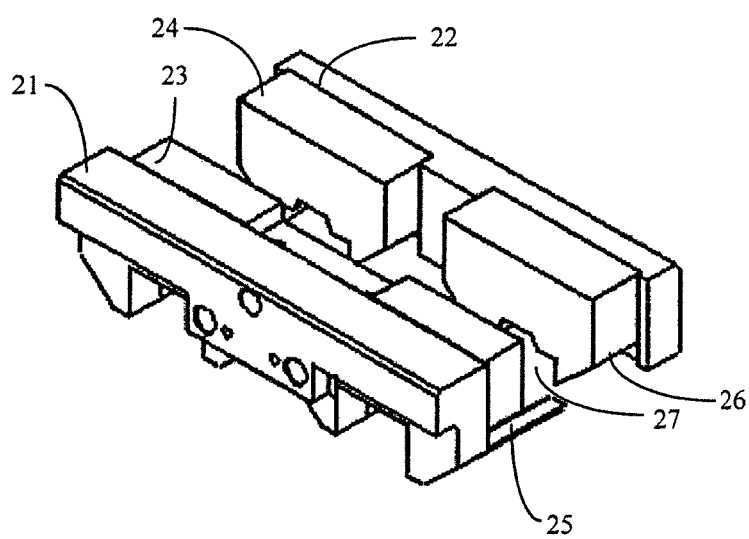
FIG. 6 illustrates the pre-forming assembly of FIG. 5 from another angle.
Figure 7:
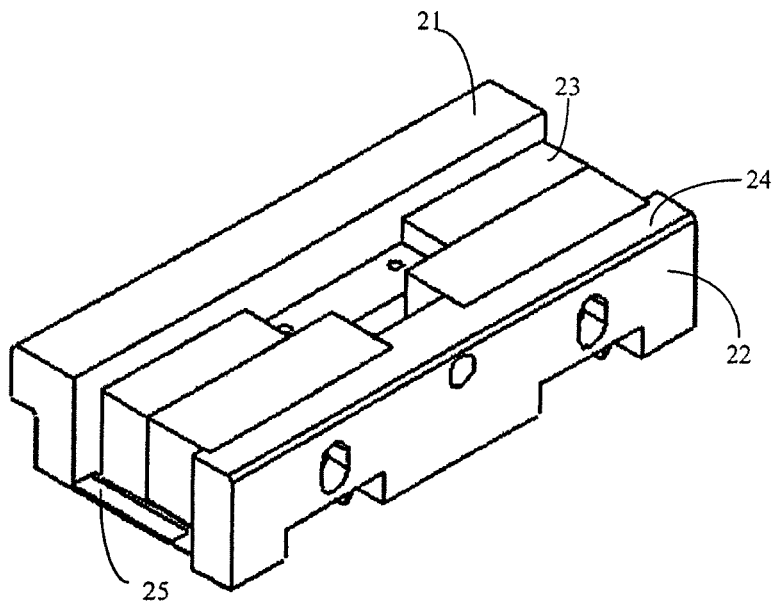
FIG. 7 illustrates the pressed state of the pre-forming assembly of FIG. 5.
Figure 8:
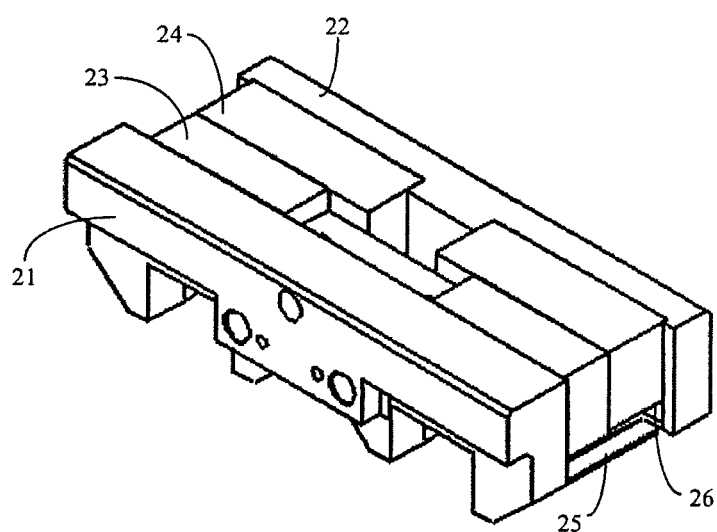
FIG. 8 illustrates the pressed state of the pre-forming assembly of FIG. 6 from another angle.
Figure 9:
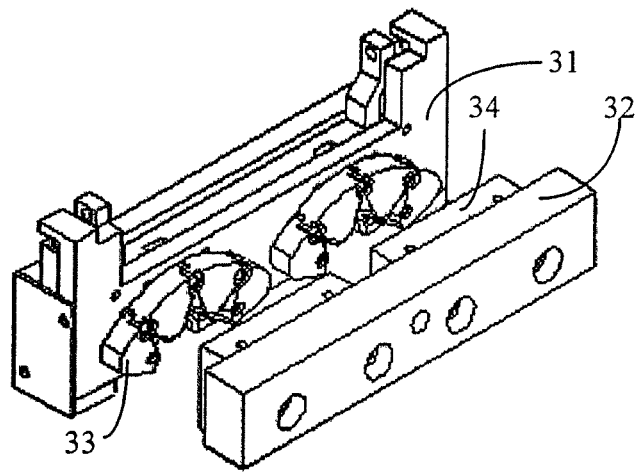
FIG. 9 is a schematic view illustrating a forming assembly of the dumpling automation machine according to a preferable embodiment of the present invention.

FIGS. 2-4 illustrate the mold assembly of the dumpling automation machine according to one preferable embodiment of the present invention. The mold assembly comprises a cover plate 11 and a bottom plate 12 spaced from each other in a vertical direction and fixedly connected with each other via connecting rods as shown in the drawings. One or more cup stands 13 are arranged between the cover plate 11 and the bottom plate 12 and mounted on the bottom plate 12. Two cup stands 13 are schematically shown in the drawings. Each cup stand 13 has an opening communicated with an opened groove 14 in the cover plate 11, thus the dough pad cut down may be directed to pass through the opened groove 14 and uprightly received in the cup stand 13 after the filling is injected. For this purpose, the opened groove 14 may be configured to have two elongated end portions and an enlarged middle portion. The middle portion is aligned with the opening of the cup stand 13 for receiving the portion of the dough pad which is injected with the filling and formed as the filling pocket, and the two elongated end portions are used to receive the portion of the dough pad forming the crest and serve as the travelling passage of the bending assembly which will be explained in details as follows.

FIGS. 5-8 illustrate the pre-forming assembly of the dumpling automation machine according to one preferable embodiment of the present invention. The pre-forming assembly comprises a first pressing plate base 21 and a second pressing plate base 22, wherein a first pressing plate 23 and a second pressing plate 24 are respectively arranged on the first pressing plate base 21 and the second pressing plate base 22, and therefore be driven to reciprocatingly move relative to each other. In the illustrated structure, the first pressing plate 23 and the second pressing plate 24 are respectively provided with a hollowed-out portion 27. When the mold assembly is moved to the pre-forming position, the first pressing plate 23 and the second pressing plate 24 are reciprocatingly moved along a top of the cover plate 11 of the mold assembly relative to each other so as to pre-press the dough pad emerging from the cover plate 11 to form the pre-pressed crest without pressing the filling pocket, thereby preventing the filling overflowing.

According to the present invention, the pre-bending portions are pre-formed in the pre-forming position, and then bent in the forming position to form the bending portions on the two ends of the crest. For this purpose, according to one embodiment shown in the drawings, one of the two pressing plates is provided with an inclined shearing surface, and accordingly, the other one is provided with an inclined shearing projection. For example, the first pressing plate 23 is provided with an inclined shearing projection 25 and the second pressing plate 24 is provided with an inclined shearing surface 26. Depending on the actual design requirements, the inclined shearing surface and the inclined shearing projection are arranged in pairs at the pressing portions on the two ends of one pressing plate, or respectively arranged on the two opposite pressing plates. When the first pressing plate 23 and the second pressing plate 24 are pressed relative to each other, the dough pad is fitted between the inclined shearing surface 26 and the inclined shearing projection 25 so as to form the pre-bending portions on the two ends of the crest.

Figure 10:
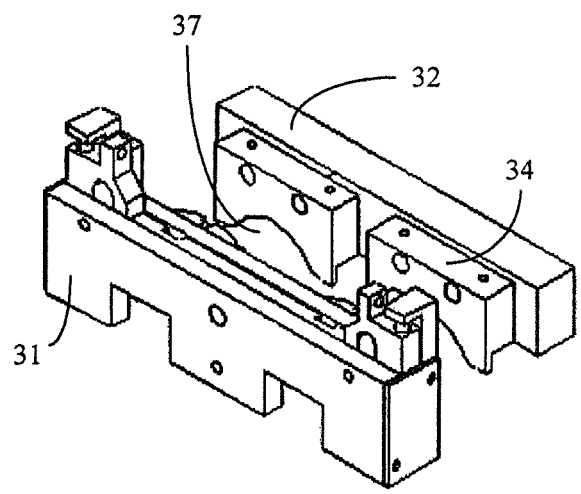
FIG. 10 illustrates the forming assembly of FIG. 9 from another angle.
Figure 11:
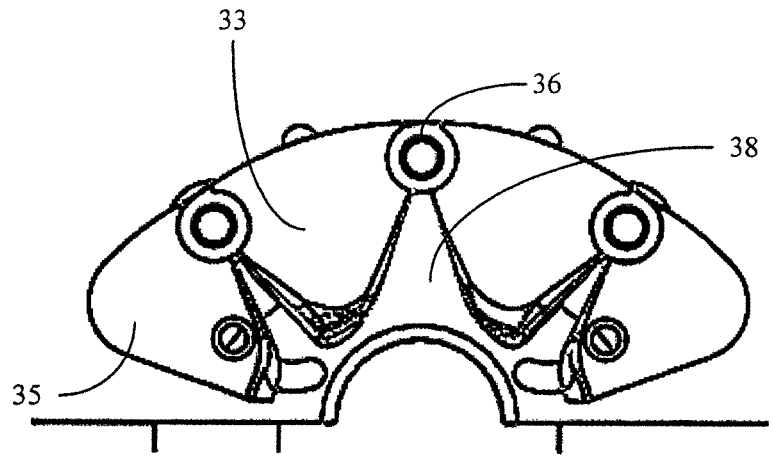
FIG. 11 is a schematic view illustrating a crab claw structure of the forming assembly of FIG. 9 in a non-pressed state.
Figure 12:
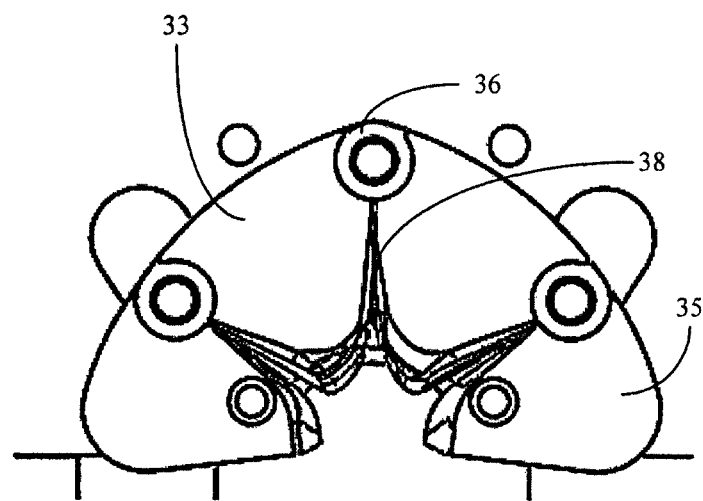
FIG. 12 is a schematic view illustrating the crab claw structure of the forming assembly of FIG. 9 in a pressed state.
Figure 13:
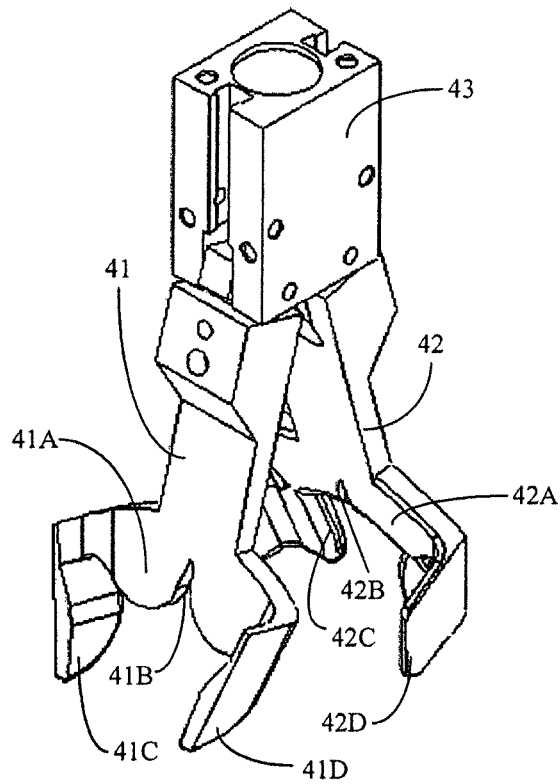
FIG. 13 is a schematic view illustrating a clamping assembly of the dumpling automation machine according to a preferable embodiment of the present invention.
Figure 14:
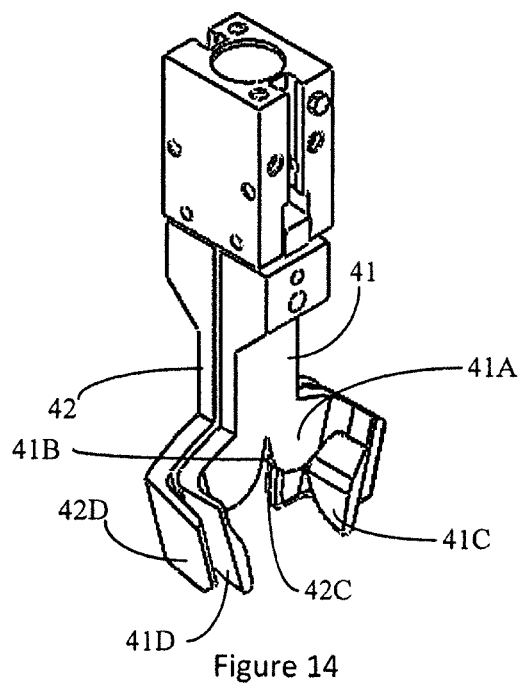
FIG. 14 is a schematic view illustrating the clamping device of FIG. 13 in the clamped state, wherein the clamped dumpling-like food is not shown.
Figure 15:
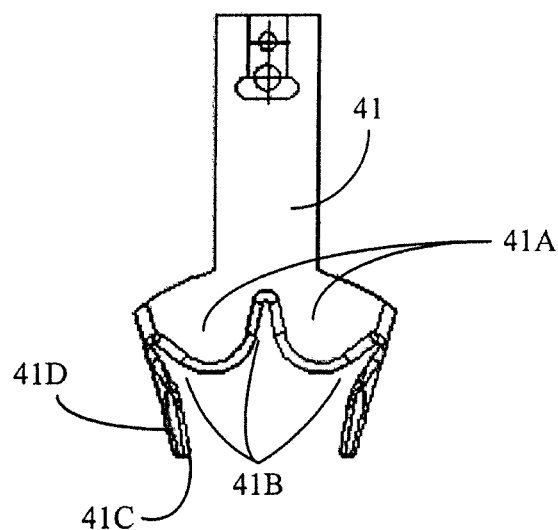
FIG. 15 is a planar schematic view illustrating a first clamp of the clamping device of FIG. 13.

After forming the pre-pressed crest and the pre-bending portions on the two ends of the crest, the dumpling-like food products are conveyed to the forming position by the mold assembly. FIGS. 9-12 illustrate the forming assembly of the dumpling automation machine according to one preferable embodiment of the present invention. The forming assembly comprises a first forming plate base 31 and a second forming plate base 32 arranged opposite to each other, wherein a first forming plate 33 and a second forming plate 34 are respectively arranged on the first forming plate base 31 and the second forming plate base 32 and therefore be driven to reciprocatingly move relative to each other. According to a preferable embodiment, the first forming plate 33 is provided with a crab claw structure having a plurality of crab claw sheets 35 articulated at pivoting points 36. For example, four crab claw sheets are shown in the drawings. Preferably, the second forming plate 34 is further provided with a hollow-out area 37, as shown in FIG. 10. Similarly, the plurality of crab claw sheets 35 have a hollow-out portion corresponding to the hollow-out area 37, and are configured to form a hollow-out area 38 between each two crab claw sheets 35, as shown in FIGS. 11 and 12. When the mold assembly is in the forming position, the first forming plate 33 and the second forming plate 34 are reciprocatingly moved along the top of the cover plate 11 of the mold assembly relative to each other so as to press and form the crest. At this moment, the plurality of crab claw sheets 35 are pressed and pivoted relatively and form one or more convex ribs on the filling pocket by shrinking the hollow-out area 38. For example, three convex ribs are formed in FIG. 12. By this means, the formed dumpling-like food products have similar shape as pressed by the articulations digitorum manus of people's hand, and the final formed dumpling-like food products have high degree of simulation, and therefore conform to the aesthetic criteria of people on the traditional handmade dumpling-like food products.

Upon final formation, as best shown in FIG. 4, in order to bend the pre-bending portions on the two ends of the crest, the present invention further provides a bending assembly. Preferably, the bending assembly is arranged on the mold assembly, and comprises a sliding rod 15 arranged in the cup stand 13, a sliding block 16 capable of moving along the sliding rod 15 and a pair of bending rods 17 arranged on the two sides of the sliding block 16 and swinging from the horizontal direction to the perpendicular direction as the sliding block 16 moves. When the dumpling-like food product is to be formed finally, i.e., when the mold assembly is in the forming position, the sliding block 16 and the bending rods 17 slide upwards and move out of the cup stand 13 and the bending rods 17 pass through the opened groove 14 in the cover plate 11 and swing upwards, as shown in FIG. 3, thereby pressing and bending the pre-bending portions on the two ends of the crest to from the bending portions.

After the formation of the dumpling-like food products in the forming position, the dumpling-like food products are clamped by the clamping device to be positioned in the box for packaging. FIGS. 13-16 illustrate the clamping device of the dumpling automation machine according to one preferable embodiment of the present invention. The clamping device comprises a first clamp 41 and a second clamp 42 capable of abutting against each other and driven to perform connecting, opening and closing operation via a cylinder 43. In the illustrated embodiment, the clamping device not only serves to clamp the food product, but also consolidates and enhances the shaping of the food product. For example, the first clamp 41 and the second clamp 42 are respectively provided with structural portions corresponding to surficial features of the formed dumpling-like food product in order to clamp the crest during the clamping. Especially, the first clamp 41 and the second clamp 42 are respectively provided with a bending area for further bending the bending portions so as to help to put the formed dumpling-like food product into the box.

Figure 16:
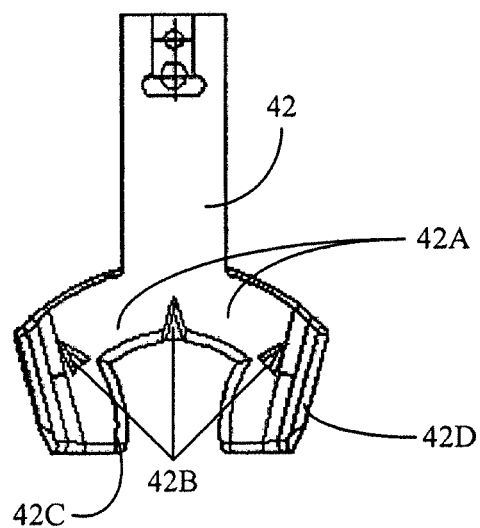
FIG. 16 is a planar schematic view illustrating a second clamp of the clamping device of FIG. 13.

Specifically, the first clamp 41 may be configured to be U-shaped and have two pressing areas 41A for enhancing the pitching of the surface of the clamped dough pad and two bending areas 41D vertically extending from the ends of the pressing areas 41A respectively. A hollow-out void area 41B is formed between the two pressing areas 41A and between the pressing area 41A and the bending area 41D, thereby enhancing the pitching of the convex ribs formed by the forming assembly. Additionally, the two bending areas 41D are respectively provided with a pressing area 41C opposite to each other and protruding slightly. The pressing area 41C can assist to press the filling pocket so that the shape of the dumpling is relatively fuller, and the filling is more compact. Similarly, the second clamp 42 may also be configured to be U-shaped and provided with pressing areas 42A, hollow-out void areas 42B and bending areas 42D. As shown in FIG. 16, the pressing areas 42C extend from the bending areas 42D in the plane of the pressing area relative to each other. With this structure design, when the dumpling-like food is clamped between the first clamp 41 and the second clamp 42, the pressing areas 41A, 42A further pinch the crest, and the pressing areas 41C, 42C can cover and tighten the filling pocket and cooperate with the hollow-out void areas 41B, 42B to make the convex ribs more obvious. Moreover, the bending areas 41D, 42D can bend and compact the bending portions, thus the formed dumpling-like food product has a compact crest, a full pocket, a unique shape and is easy to be put into the box.

The above illustrates and describes basic principles, main features and advantages of the present disclosure. Those skilled in the art should appreciate that the above embodiments do not limit the present disclosure in any form. Technical solutions obtained in a way of equivalent substitution or equivalent variations all fall within the scope of the present disclosure.

The invention claimed is:

1. A dumpling automation machine comprising a forming assembly for preparing a dumpling-like food product having a filled pocket, the forming assembly including a pair of reciprocating forming plates arranged opposite to each other, a crab-claw structure provided on at least one of the forming plates and including a plurality of crab-claw fingers articulated together wherein the pair of forming plates are configured to be reciprocated toward each other and pressed together, and the plurality of crab-claw fingers are configured to then pivot to press and form one or more convex ribs on the filled pocket of the dumpling-like food product.

2. The dumpling automation machine according to claim 1, wherein the dumpling automation machine further comprises a mold assembly arranged upstream of the forming assembly for supporting a dough pad injected with a filling and maintaining the dough pad in an upright position.

3. The dumpling automation machine according to claim 2, wherein the mold assembly comprises a cover plate and a bottom plate spaced from each other in a vertical direction, and one or more cup stands are arranged between the cover plate and the bottom plate and installed on the bottom plate, and wherein each cup stand has an opening communicated with an opened groove in the cover plate so that the dough pad cut down is directed to pass through the opened groove and received in a respective said cup stand and kept in the upright position after being injected with the filling.

4. The dumpling automation machine according to claim 3, wherein the mold assembly is configured to successively support the dough pad in different positions along a conveyor.

5. The dumpling automation machine according to claim 4, wherein the dumpling automation machine further comprises a pre-forming assembly arranged between the mold assembly and the forming assembly for pre-pressing the upright dough pad to form a pre-pressed crest.

6. The dumpling automation machine according to claim 5, wherein in a pre-forming position, pre-bending portions on the two ends of the crest are formed by the pre-forming assembly, and in a forming position, the pre-bending portions are bent to form bending portions by a bending assembly.

7. The dumpling automation machine according to claim 6, wherein the pre-forming assembly comprises a first pressing plate and a second pressing plate arranged opposite to each other, and when the mold assembly is in the pre-forming position, the first pressing plate and the second pressing plate are reciprocatingly moved along a top of the cover plate relative to each other so as to pre-press the dough pad and form the pre-pressed crest.

8. The dumpling automation machine according to claim 7, wherein one of the first pressing plate and the second pressing plate is provided with an inclined shearing surface, and the other one is provided with a corresponding inclined shearing projection so that when the first pressing plate and the second pressing plate press with each other, the dough pad is fitted between the inclined shearing surface and the inclined shearing projection to form the pre-bending portions on the two ends of the crest.

9. The dumpling automation machine according to claim 6, wherein the pair of the forming plates of the forming assembly are reciprocatingly moved along a top of the cover plate relative to each other so as to press the pre-pressed crest and form the crest when the mold assembly is in the forming position.

10. The dumpling automation machine according to claim 6, wherein the bending assembly is arranged on the mold assembly, and comprises a sliding rod arranged in the cup stand, a sliding block capable of moving along the sliding rod and a pair of bending rods arranged on the two sides of the sliding block and swinging from the horizontal direction to the perpendicular direction along with the motion of the sliding block, and when the mold assembly is in the forming position, the sliding block and the bending rods slide out of the cup stand and the bending rods swing upwards to bend the pre-bending portions on the two ends of the crest to from the bending portions.

11. The dumpling automation machine according to claim 6, wherein the dumpling automation machine further comprises a clamping assembly for clamping and putting the dumpling-like food product formed by pressing into a box.

12. The dumpling automation machine according to claim 11, wherein the clamping assembly comprises a first clamp and a second clamp configured to abut against each other, the first clamp and the second clamp being respectively provided with a bending area for bending the bending portions for fitting into the box when the first clamp and the second clamp abut and press the dumpling-like food product formed by pressing.

13. The dumpling automation machine according to claim 12, wherein the first clamp and the second clamp are respectively provided with structural portions corresponding to surficial features of the dumpling-like food product formed by pressing, thereby enhancing the forming during the clamping.

14. The dumpling automation machine according to claim 4, wherein the conveyor comprises a circular rotary guide rail.

15. The dumpling automation machine according to claim 14, wherein the dumpling automation machine further comprises a cutting assembly and a filling injector arranged upstream of the pair of reciprocating forming plates in turn along the conveyor.

* * * * *